(12) United States Patent
Li et al.

(10) Patent No.: US 12,377,803 B2
(45) Date of Patent: Aug. 5, 2025

(54) SUNROOF DEVICE

(71) Applicants: HSIN CHONG MACHINERY WORKS CO. LTD., Taoyuan (TW); FUZHOU MINGFANG AUTOMOBILE PARTS INDUSTRY CO., LTD., Fuzhou (CN)

(72) Inventors: Chih-Wei Li, Taoyuan (TW); Sin-Hao He, Taoyuan (TW); Yi-Jen Lan, Yilan County (TW); Tzu-Chiang Lee, New Taipei (TW); Jeng-Yin Lan, New Taipei (TW)

(73) Assignees: HSIN CHONG MACHINERY WORKS CO. LTD., Taoyuan (TW); FUZHOU MINGFANG AUTOMOBILE PARTS INDUSTRY CO., LTD., Fuzhou (CN)

( * ) Notice: Subject to any disclaimer, the term of this patent is extended or adjusted under 35 U.S.C. 154(b) by 395 days.

(21) Appl. No.: 18/126,400

(22) Filed: Mar. 25, 2023

(65) Prior Publication Data
US 2024/0166149 A1    May 23, 2024

(30) Foreign Application Priority Data
Nov. 22, 2022 (CN) .......................... 202211465259.4

(51) Int. Cl.
*B60R 16/03* (2006.01)
*B60J 7/043* (2006.01)
*B60R 16/023* (2006.01)

(52) U.S. Cl.
CPC .............. *B60R 16/03* (2013.01); *B60J 7/043* (2013.01); *B60R 16/023* (2013.01)

(58) Field of Classification Search
CPC ........ B60R 16/03; B60R 16/023; B60J 7/043; B60J 7/0435; B60J 7/047; B60J 7/05
USPC .... 296/221, 222, 220.01, 216.02–216.5, 215
See application file for complete search history.

(56) References Cited

U.S. PATENT DOCUMENTS

| | | | | |
|---|---|---|---|---|
| 4,934,753 A | * | 6/1990 | Gajewski | B60J 7/0573 296/211 |
| 5,154,481 A | * | 10/1992 | Paetz | B60J 7/05 200/61.78 |
| 5,261,722 A | * | 11/1993 | Staley | B60J 7/02 296/211 |
| 5,520,434 A | * | 5/1996 | Paetz | B60J 7/00 296/222 |

(Continued)

*Primary Examiner* — Dennis H Pedder
(74) *Attorney, Agent, or Firm* — Chun-Ming Shih; hdls ipr services

(57) ABSTRACT

This disclosure is directed to a sunroof device having a window frame assembly, a pair of linkage assemblies, a panel assembly, a first electrical connector and a second electrical connector. The window frame assembly has a pair of rails. The linkage assemblies are disposed on the rails respectively. The panel assembly is disposed on the pair of linkage assemblies. The first electrical connector on the window frame assembly has a plugging slot and an opening, the opening is located at a side of the first electrical connector and extended to a top of the first electrical connector. The second electrical connector on the panel assembly has a conductive terminal. When the panel assembly rotates, the conductive terminal is plugged in the plugging slot through the opening and movable with the panel assembly in the opening.

21 Claims, 8 Drawing Sheets

(56) References Cited

U.S. PATENT DOCUMENTS

| | | | | |
|---|---|---|---|---|
| 5,545,261 | A * | 8/1996 | Ganz | B60J 7/00 |
| | | | | 296/211 |
| 6,036,259 | A * | 3/2000 | Hertel | H02G 11/00 |
| | | | | 174/117 F |
| 6,155,635 | A * | 12/2000 | Wecker | H10F 19/80 |
| | | | | 296/211 |
| 6,337,436 | B1 * | 1/2002 | Ganz | H02S 40/34 |
| | | | | 438/57 |
| 6,398,173 | B1 * | 6/2002 | Sawayanagi | B60J 3/0221 |
| | | | | 296/97.9 |
| 6,485,090 | B1 * | 11/2002 | Patz | B60J 7/003 |
| | | | | 296/214 |
| 8,336,954 | B2 * | 12/2012 | Yamamoto | H02G 3/0437 |
| | | | | 296/213 |
| 9,573,449 | B2 * | 2/2017 | Park | B60J 7/043 |
| 9,579,957 | B2 * | 2/2017 | Park | B60J 7/0573 |
| 9,641,124 | B2 * | 5/2017 | Eo | H10F 77/939 |

\* cited by examiner

SUNROOF DEVICE

BACKGROUND OF THE DISCLOSURE

Technical Field

This disclosure is directed to a vehicle sunroof, and in particular to a sunroof device having a movable electrical connecting structure.

Description of Related Art

A related-art sunroof of a vehicle is only applied for lighting or ventilation of the interior of the vehicle. A related-art vehicle sunroof with electronic components disposed thereon and electrically connected to a vehicle circuit may be used for various purposes. For example, a portion or all of the vehicle sunroof glass may change color for adjusting a light transmittance thereof, a solar panel may be arranged on the vehicle sunroof for supplying power to the vehicle circuit, or additional lamps may be installed on the vehicle sunroof. Generally, a circuit on the vehicle sunroof is electrically connected to the vehicle circuit via electrical connectors coupled with each other. However, it is difficult to provide a stable electrical connection to a movable vehicle sunroof because of a motion of the movable vehicle sunroof. In particular, a vehicle moving in high speed or an uneven road may lead to vibrations on the vehicle, and it is therefore difficult to make the circuit on the vehicle sunroof be stably connected with the vehicle circuit.

In view of the above drawbacks, the inventor proposes this disclosure based on his expert knowledge and elaborate researches in order to solve the problems of related art.

SUMMARY OF THE DISCLOSURE

This disclosure is directed to a vehicle sunroof and in particular to a sunroof device having a movable electrical connecting structure.

This disclosure is directed to a sunroof device having a window frame assembly, a pair of linkage assemblies, a panel assembly, a first electrical connector and a second electrical connector. The window frame assembly has a pair of rails. The linkage assemblies are disposed on the rails respectively. The panel assembly is disposed on the pair of linkage assemblies. The first electrical connector is disposed on the window frame assembly, and has a plugging slot and an opening corresponding to the plugging slot. The opening is located at a side of the first electrical connector and the opening is extended to a top of the first electrical connector. The second electrical connector is attached to the panel assembly and has a conductive terminal. When the panel assembly rotates, the conductive terminal is plugged in the plugging slot through the opening and capable of moving in the opening with the panel assembly.

According to an embodiment of this disclosure, the panel assembly is capable of moving with the pair of linkage assemblies in a moving path, the conductive terminal is plugged in the plugging slot through the opening when the panel assembly moves in the moving path.

According to an embodiment of this disclosure, the first electrical connector has an insulation seat and a conductive seat arranged on the insulation seat, the conductive seat has a pair of conductive plates, the pair of conductive plates are separated from each other and the plugging slot is defined between the pair of conductive plates, and the opening is defined on the insulation seat. The conductive terminal is clamped between the pair of conductive plates when the conductive terminal is plugged to the plugging slot through the opening. The conductive seat is made of a metal sheet by stamping, and the pair of conductive plates and the conductive seat are in a one-piece form (or integrally formed).

According to an embodiment of this disclosure, each of the conductive plates has a guiding slope, the pair of guiding slopes are extended toward the opening and expanded outward.

According to an embodiment of this disclosure, in each of the linkage assemblies, the linkage assembly has a linkage member, the rotational shafts are arranged in the corresponding rails respectively and capable of sliding along longitudinal directions of the corresponding rails respectively, the linkage members are attached on the panel assembly, and the linkage members are connected to the rotational shafts respectively.

According to an embodiment of this disclosure, the first electrical connector has an insulation seat and a conductive seat arranged on the insulation seat, the window frame assembly has a front frame, and the insulation seat and the front frame are in a one-piece form (or integrally formed).

According to an embodiment of this disclosure, each of the rails has a front rail end corresponding to the open-close path, the first electrical connector is disposed adjacent to one of the front rail ends.

According to an embodiment of this disclosure, each of the rails has a front rail end corresponding to the open-close path, when the panel assembly rotates in the open-close path, the linkage assemblies are located at the front rail ends respectively.

According to an embodiment of this disclosure, the panel assembly has a front edge, the front edge is disposed to straddle the pair of linkage assemblies and the rotation axis is disposed adjacent to the front edge.

This disclosure is directed to another sunroof device having sunroof device having a window frame assembly, a pair of linkage assemblies, a panel assembly, a first electrical connector and a second electrical connector. The window frame assembly has a pair of rails, the pair of rails are arranged on two opposite sides of the window frame assembly and disposed parallelly to each other. The linkage assemblies are arranged on the rails respectively and capable of sliding along the corresponding rails respectively, each of the linkage assemblies has a rotational shaft, and the pair of rotational shafts are collectively arranged on a rotation axis. The panel assembly is arranged on the pair of linkage assemblies, and the panel assembly is capable of moving in an open-close path and a moving path with the pair of linkage assemblies. A rear end portion of the panel assembly may rotate away from the window frame assembly around the rotation axis in the open-close path. The first electrical connector is arranged on the window frame assembly, the first electrical connector has an opening and a plugging slot corresponding to the opening, the opening is arranged at a side of the first electrical connector and extended to a top of the first electrical connector. The second electrical connector is arranged on a front-end portion of the panel assembly, and the second electrical connector has a conductive terminal. The conductive terminal is plugged to the plugging slot through the opening when the panel assembly is moved in the moving path.

According to an embodiment of this disclosure, the first electrical connector has an insulation seat and a conductive seat arranged on the insulation seat, the conductive seat has a pair of conductive plates, the pair of conductive plates are separated from each other and the plugging slot is defined between the pair of conductive plates, and the opening is defined on the insulation seat. The conductive terminal is clamped between the pair of conductive plates when the conductive terminal is plugged to the plugging slot through the opening. The conductive seat is made of a metal sheet by stamping, and the pair of conductive plates and the conductive seat are in a one-piece form (or integrally formed).

According to an embodiment of this disclosure, each of the conductive plates has a guiding slope, the pair of guiding slopes are extended toward the opening and expanded outward.

According to an embodiment of this disclosure, in each of the linkage assemblies, the linkage assembly has a linkage member, the rotational shafts are arranged in the corresponding rails respectively and capable of sliding along longitudinal directions of the corresponding rails respectively, the linkage members are attached on the panel assembly, and the linkage members are connected to the rotational shafts respectively.

According to an embodiment of this disclosure, the first electrical connector has an insulation seat and a conductive seat arranged on the insulation seat, the window frame assembly has a front frame, wherein the insulation seat and the front frame are in a one-piece form (or integrally formed).

According to an embodiment of this disclosure, each of the rails has a front rail end corresponding to the open-close path, the first electrical connector is disposed adjacent to one of the front rail ends.

According to an embodiment of this disclosure, each of the rails has a front rail end corresponding to the open-close path, when the panel assembly rotates in the open-close path, the linkage assemblies are located at the front rail ends respectively.

According to an embodiment of this disclosure, the panel assembly has a front edge, the front edge is disposed to straddle the pair of linkage assemblies and the rotation axis is disposed adjacent to the front edge.

According to the sunroof device of this disclosure, when the panel assembly is located in the open-close path, the opening extended from a side of the conductive seat to a top of the conductive seat may keep the conductive terminal being plugged in the plugging slot with a rotation of the panel assembly, so that a power supply to the panel assembly is maintained.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
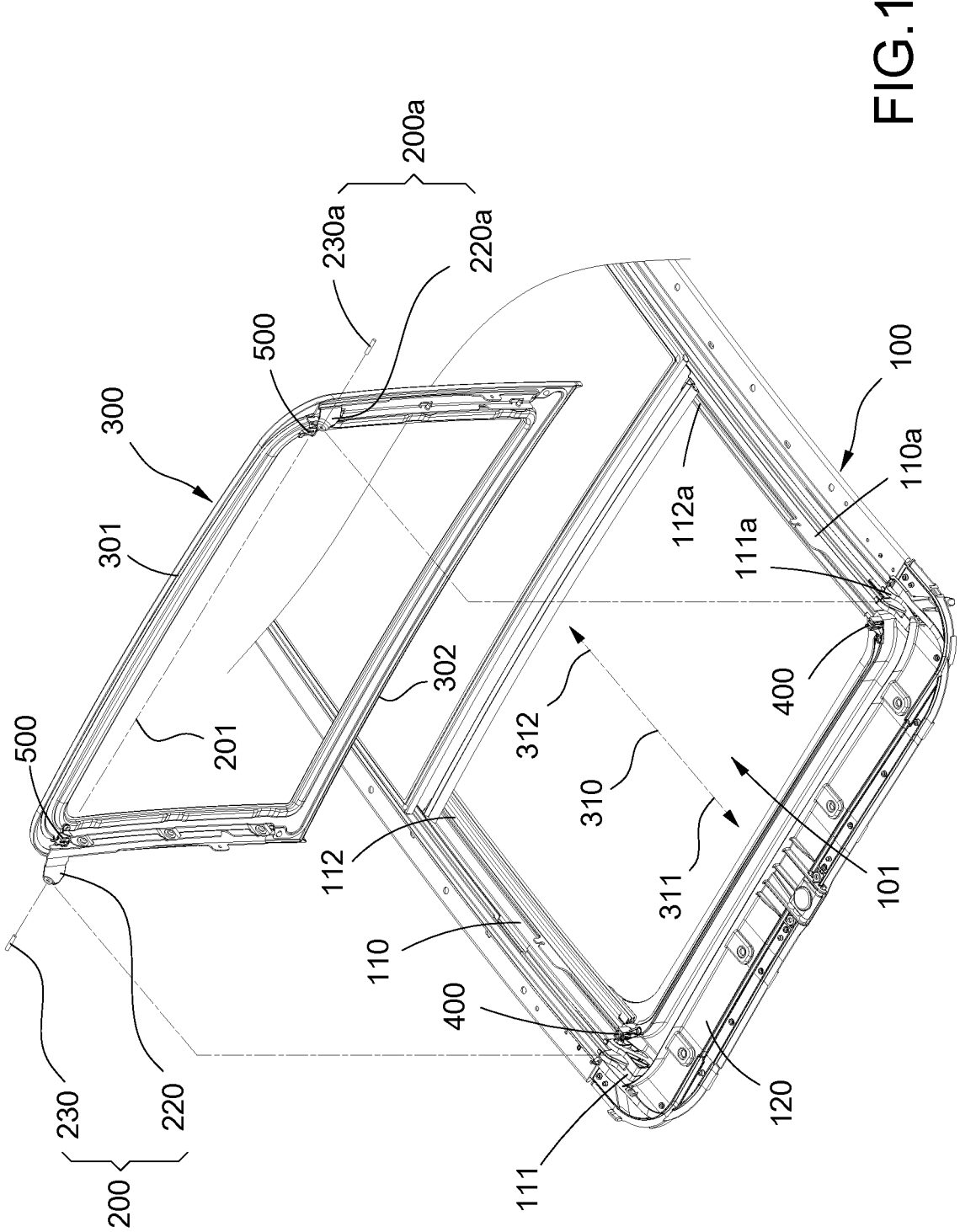
FIG. 1 is an exploded view showing a sunroof device according to this disclosure.

According to FIG. 1, an embodiment of this disclosure is directed to a sunroof device installed on a vehicle roof. According to this embodiment, the sunroof device of this disclosure has a window frame assembly 100, a pair of linkage assemblies 200, 200a, a panel assembly 300, a first electrical connector 400 and a second electrical connector 500.

According to FIG. 1, a window 101 is enclosed by the window frame assembly 100, the window frame assembly 100 has a pair of rails 110, 110a, each of the rails 110/110a has a front rail end 111/111a and a rear rail end 112/112a opposite to the front rail end 111/111a. The pair of rails 110, 110a are disposed parallelly to each other and arranged on two opposite side of the window 101, the pair of front rail ends 111, 111a are disposed opposite to each other, and the pair of rear rail ends 112, 112a are disposed opposite to each other. A front frame 120 is disposed to straddle the pair of front rail ends 111, 111a. According to this embodiment, the front rail ends 111, 111a are arranged on the rails 110, 110a as separated parts, or those may be formed as one piece, but scopes of this disclosure should not be limited to the embodiment.

Figure 2:
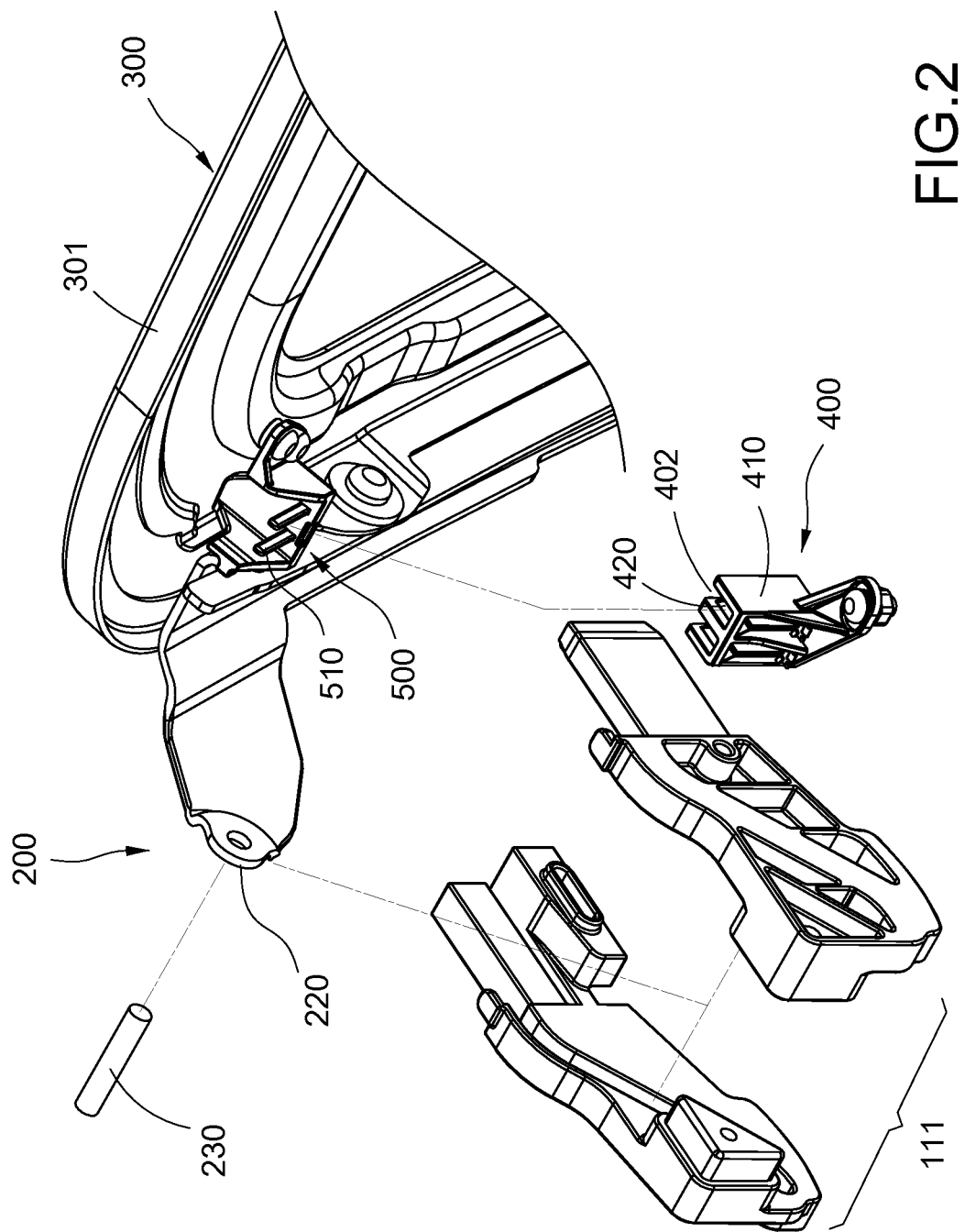
FIG. 2 is an exploded view showing a linkage assembly of the sunroof device according to this disclosure.
Figure 3:
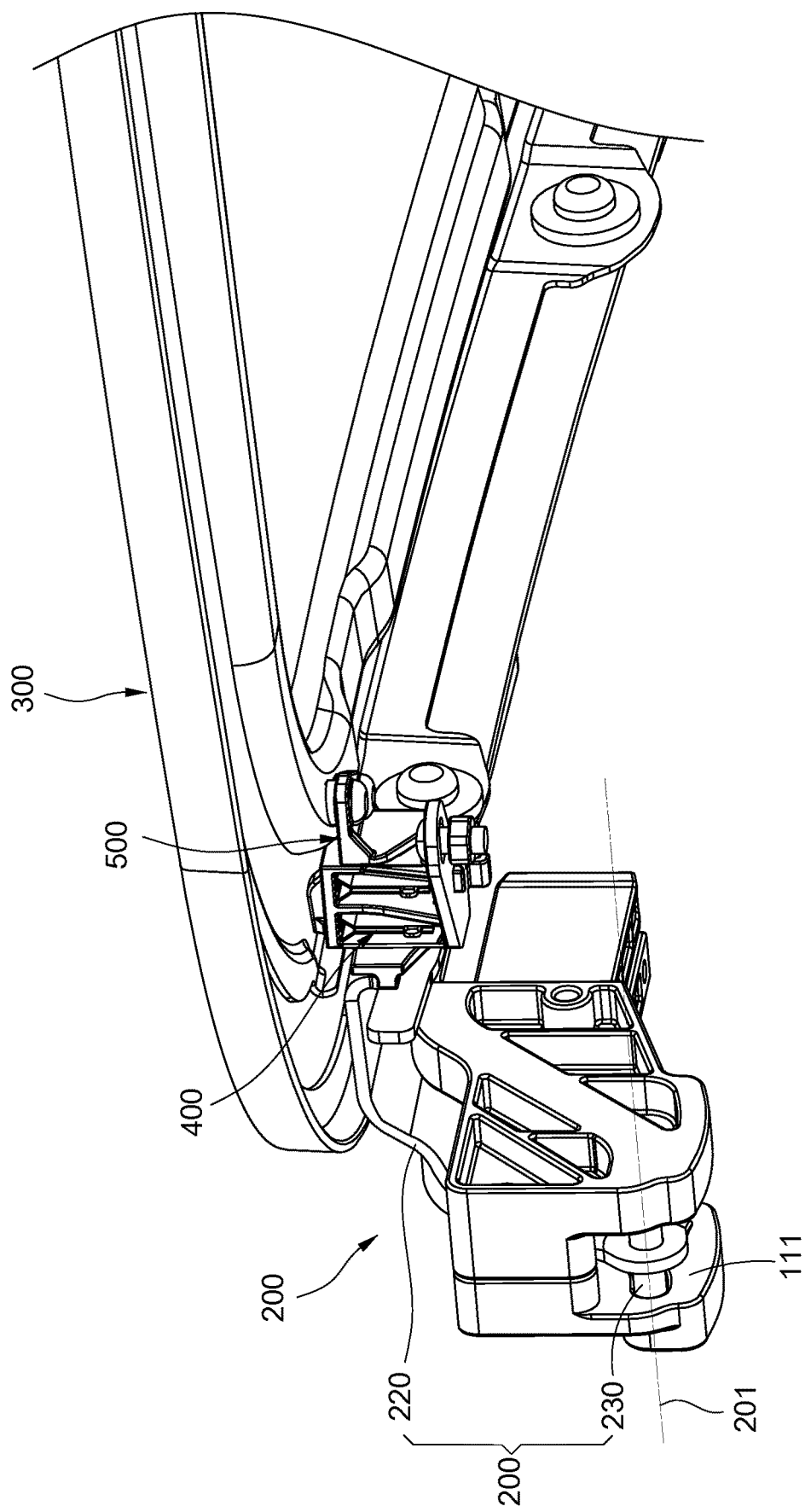
FIG. 3 is a perspective view showing a combination of the linkage assembly, a panel assembly, a first electrical connector and a second electrical connector of the sunroof device according to this disclosure.

According to FIGS. 1 to 3, the pair of linkage assemblies 200, 200a are arranged on the rails 110, 110a respectively, and each linkage assembly 200/200a is capable of sliding along a longitudinal direction of the corresponding rail 110/110a. The pair of linkage assemblies 200, 200a have structures mirroring with each other, each linkage assembly 200/200a has a linkage member 220/220a and a rotational shaft 230/230a. Only one of the linkage assemblies 200 and the corresponding rail 110 are described in this embodiment as an example of structures and arrangements of the linkage assemblies 200/200a, and detail descriptions are presented following.

According to FIGS. 1 to 3, the rotational shaft 230 is arranged in the rails 110 and capable of sliding along the longitudinal direction of the rail 110, and the linkage member 220 is connected to the rotational shaft 230 and capable of rotating around the rotational shaft 230. Moreover, the pair of rotational shafts 230/230a of the pair of linkage assemblies 200/200a are collectively disposed on a rotation axis 201, the rotation axis 201 may move with the rotational shaft 230/230a, and the linkage member 220 may rotate around the rotation axis 201.

According to FIGS. 1 to 3, the panel assembly 300 is disposed to straddle the pair of linkage assemblies 200, 200a, the panel assembly 300 may move in a moving path 310 with the linkage assemblies 200, 200a, the moving path 310 is parallel to the longitudinal direction of the rails 110, 110a, and the moving path 310 has a stroke front end 311 and a stroke rear end 312 opposite to the stroke front end 311. One end of the moving path 310 corresponding to the front rail ends 111, 111a is defined as the stroke front end 311, and another end of the moving path 310 corresponding to the rear rail ends 112, 112a is defined as the stroke rear end 312.

The linkage members 220, 220a are connected to the panel assembly 300, and the panel assembly 300 is therefore capable of rotating around about the rotation axis 201 via the linkage assemblies 200, 200a, thereby defining an open-close path. Specifically, the panel assembly 300 has a front edge 301 and a rear edge 302 opposite to the front edge 301, the front edge 301 is disposed to straddle the pair of linkage assemblies 200, 200a and the rotation axis 201 is disposed adjacent to the front edge 301, and the panel assembly 300 is therefore capable of rotating around the rotation axis 201 to move the rear edge 302 upward or downward. When the panel assembly 300 is located in the open-close path, the linkage assemblies 200, 200a are located at the corresponding front rail ends 111, 111a respectively. When the panel assembly 300 is located in the open-close path, the panel assembly 300 is capable of rotating around the rotation axis 201 to move the rear edge 302 of the panel assembly 300 upward from the window frame assembly 100 to open the window 101 or rotating to move the rear edge 302 of the panel assembly 300 downward until the rear edge 302 contacts the window frame assembly 100 to close the window 101.

According to FIG. 1, the first electrical connector 400 is attached on the window frame assembly 100 and the second electrical connector 500 is attached on the panel assembly 300 to be coupled with the first electrical connector 400. Accordingly, the function of this disclosure may be achieved by a simple embodiment of a first electrical connector 400 and a corresponding second electrical connector 500. According to this embodiment, two sets of the first electrical connectors 400 and the second electrical connectors 500 are provided, only one set is taken as an example for illustrating the structure and arrangement of the first electrical connectors 400 and the corresponding second electrical connector 500.

According to FIG. 1, the first electrical connector 400 is attached on the window frame assembly 100 and disposed corresponding to the open-close path of the panel assembly 300, so that the first electrical connector 400 is disposed adjacent to one end of the rail 110. According to this embodiment, the first electrical connector 400 is attached on one end of the front frame 120 adjacent to one of the front rail ends 111, but scopes of this disclosure should not be limited to the embodiment. For example, the first electrical connector 400 may be attached on one of the front rail ends 111, or the first electrical connector 400 may be attached to a center of the front frame 120 to be arranged corresponding to the open-close path of the panel assembly 300.

Figure 4:
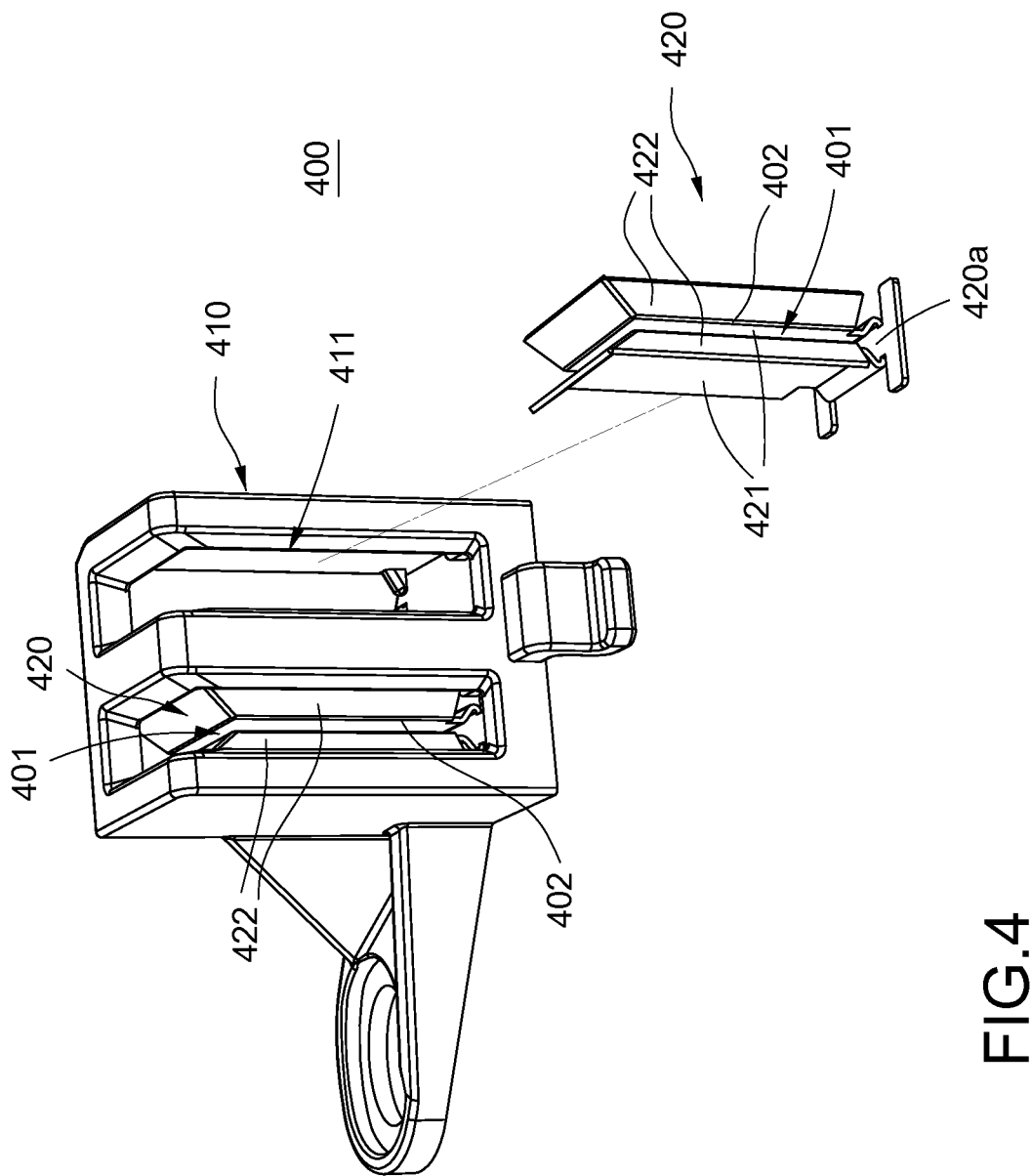
FIG. 4 is an exploded view showing the first electrical connector of the sunroof device according to this disclosure.
Figure 5:
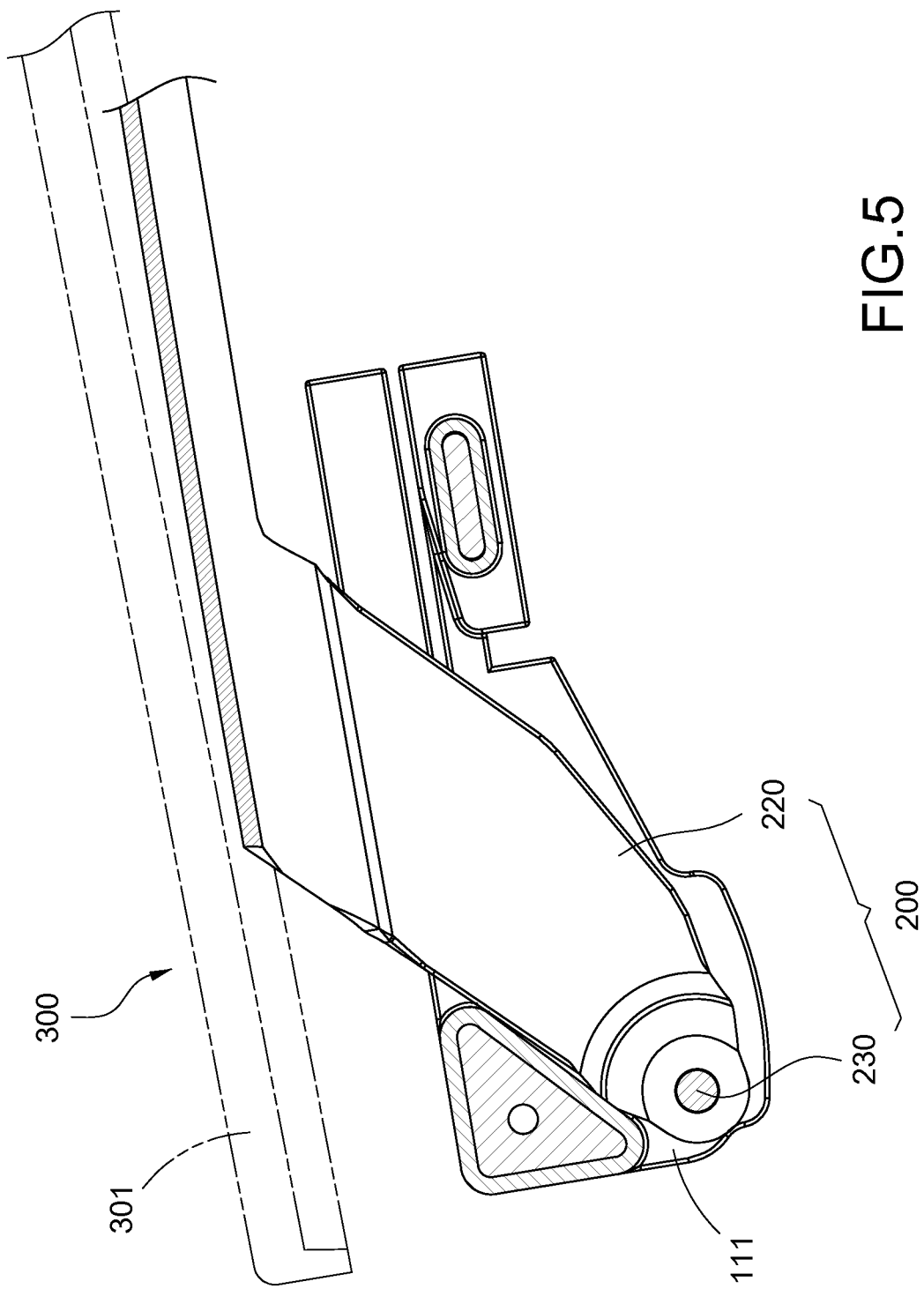
FIGS. 5 to 8 are perspective views respectively showing status in an open-close path of the sunroof device according to this disclosure.
Figure 6:
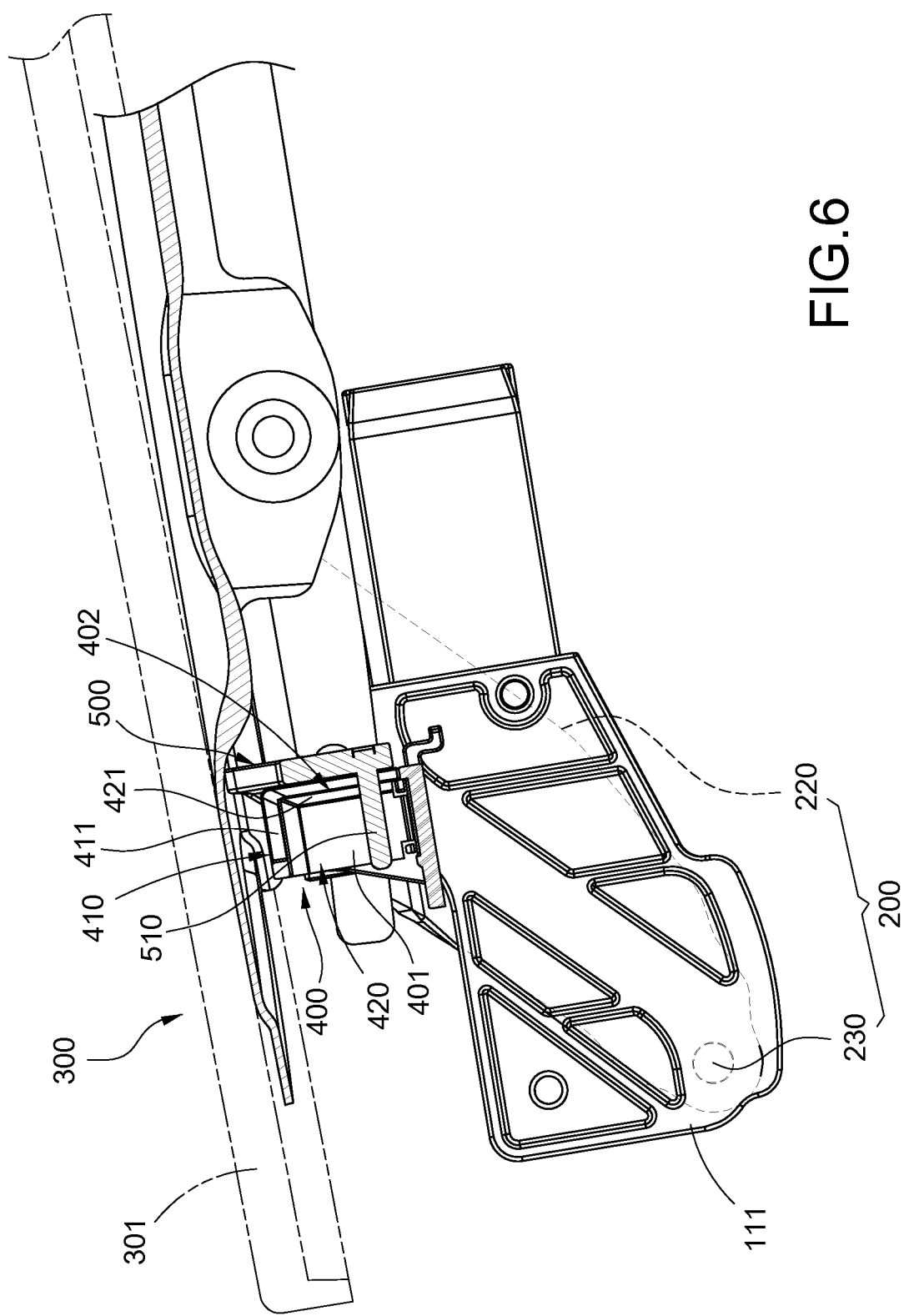
Figure 7:
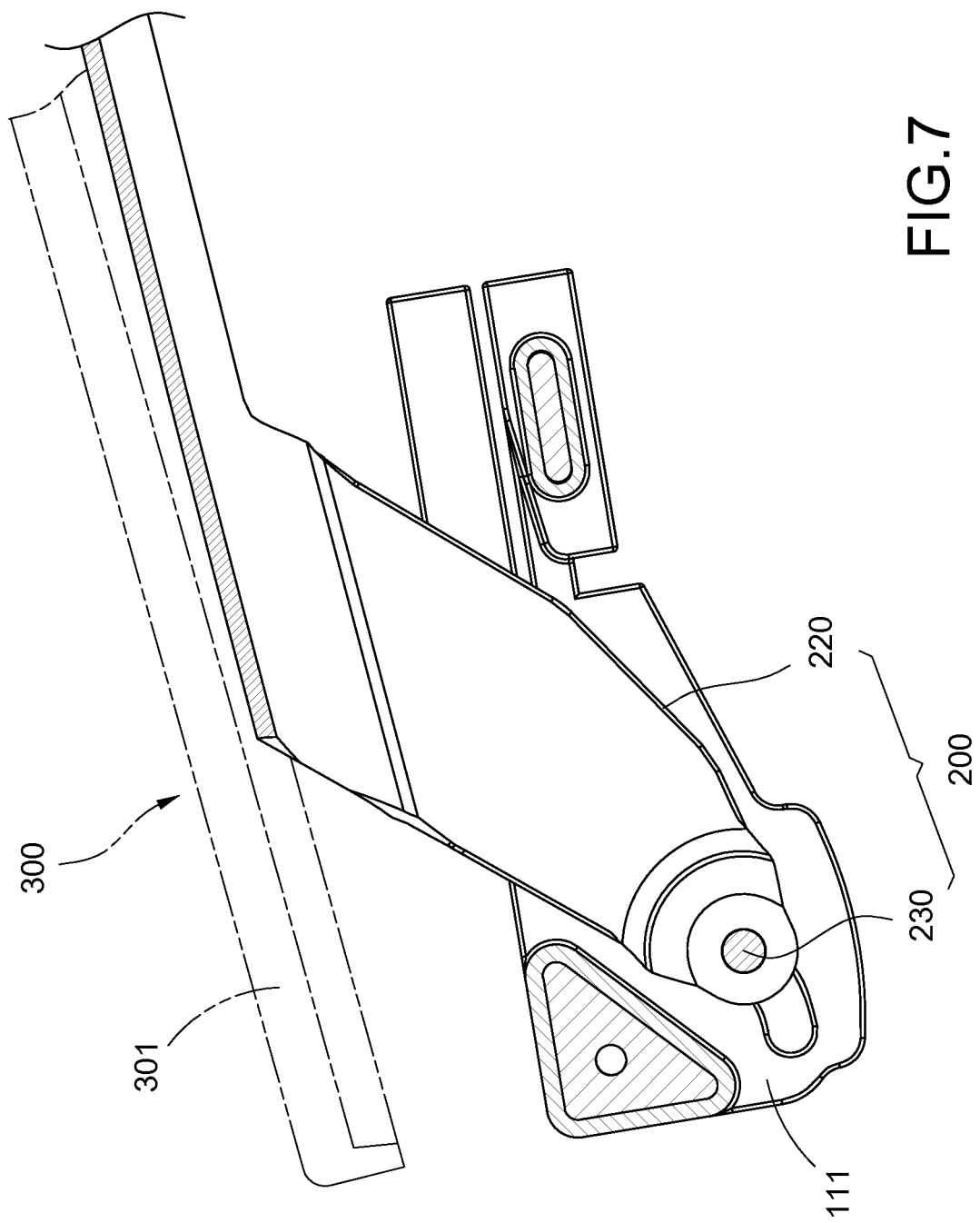
Figure 8:
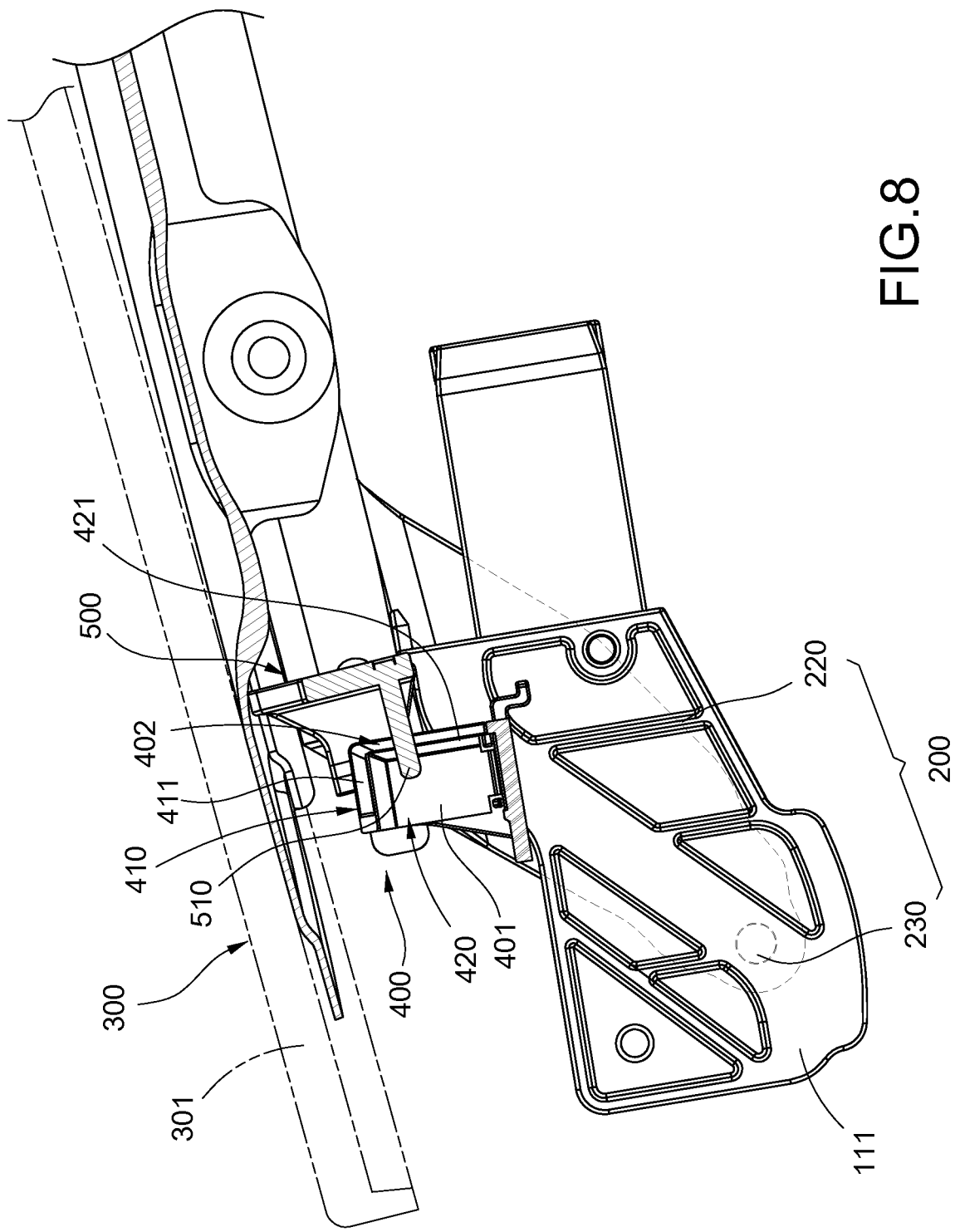

According to this embodiment shown in FIGS. 2 to 4, the first electrical connector 400 has an insulation seat 410 and a conductive seat 420, the conductive seat 420 is arranged on the insulation seat 410, the insulation seat 410 is fixed with the front frame 120 of the window frame assembly 100. In another example, the insulation seat 410 and the front frame 120 may be in a one-piece form (or integrally formed), the conductive seat 420 may be embedded in the insulation seat 410 or disposed protrusively from the insulation seat 410, but scopes of this disclosure should not be limited to the embodiment. The first electrical connector 400 has an opening 411 and a plugging slot 401 corresponding to the opening 411, the opening 411 is disposed at a side of the first electrical connector 400 and extended to a top of the first electrical connector 400 for communicating with the plugging slot 401. Specifically, the opening 411 is disposed at the side of the insulation seat 410 and extended to the top of the insulation seat 410, the plugging slot 401 is disposed on the conductive seat 420, and the second electrical connector 500 has a conductive terminal 510 for correspondingly being plugged to the plugging slot 401. The function of this disclosure may be achieved via a simple embodiment of a single conductive seat 420 cooperated with a corresponding conductive terminal 510. The first electrical connector 400 may have two conductive seats 420 as shown in this embodiment, and the second electrical connector 500 may have two conductive terminals 510 correspondingly to be electrically connected to an anode and a cathode respectively.

According to FIGS. 2 and 4, specifically, the conductive seat 420 of this embodiment may be implemented as a conductive clip, the conductive seat 420 is made of a sheet metal by stamping, the conductive plate 421 and the conductive seat 420 are in a one-piece form (or is integrally formed), the conductive plates 421 are disposed separately from each other, and the plugging slot 401 is defined between the pair of conductive plates 421. The plugging slot 401 is upright arranged, edges of at least a portion of the pair of conductive plates 421 are separated from each other to form a slot opening 402 on the conductive seat 420 and communicate to the plugging slot 401, and the slot opening 402 is disposed corresponding to the opening 411 on the insulation seat 410. Specifically, the slot opening 402 is located at the side of the conductive seat 420, a direction of the slot opening 402 is parallel to the corresponding rail 110 and toward the corresponding rear rail ends 112, and the slot opening 402 is upward extended to a top of the conductive seat 420. Each conductive plate 421 has a guiding slope 422, the guiding slopes 422 are respectively extended along the slot opening 402 and expanded outward from the slot opening 402 toward the opening 411.

According to FIGS. 1 to 3, the second electrical connector 500 is attached on the panel assembly 300 and disposed adjacent to the rotation axis 201, the second electrical connector 500 has a conductive terminal 510, and the second electrical connector 500 and a frame may be in a one-piece form (or integrally formed) in another embodiment. The number and the location of the second electrical connector 500 are disposed corresponding to the number and the location of the first electrical connector 400. The second electrical connector 500 has a conductive terminal 510 plugged in the corresponding plugging slot 401 on the first electrical connector 400. According to this embodiment, each first electrical connector 400 has a pair of plugging slots 401 and the second electrical connector 500 corresponding to the first electrical connector 400 has a pair of conductive terminals 510, but scopes of this disclosure should not be limited to the embodiment. Only one of the plugging slots 401 and the corresponding conductive terminals 510 are taken as an example for illustrating relative motions thereof. When the panel assembly 300 moves along the moving path 310 to the open-close path, the conductive terminal 510 is plugged in the plugging slot 401 through the slot opening 402. Moreover, the guiding slope 422 is capable of guiding the conductive terminal 510, which is not aligned to the plugging slot 401, to be plugged into the plugging slot 401, thereby constructing an electrical connection and reducing a requirement of assembly accuracy.

According to FIGS. 5 to 8, when the conductive terminal 510 is plugged in the plugging slot 401 through the slot opening 402, the conductive terminal 510 is clamped by the pair of conductive plates 421, so that the conductive seat 420 is electrically connected with the conductive terminal 510. When the panel assembly 300 is located in the open-close path and rotates around the rotation axis 201, the conductive terminal 510 is plugged in the plugging slot 401 through the slot opening 402, and is capable of moving with the panel assembly 300 between a lateral surface and the top of the conductive seat 420 in the slot opening 402, so as to maintain the electrical connection.

According to the sunroof device of this disclosure, when the panel assembly 300 is located in the open-close path, the slot opening 402 extended from the side of the conductive seat 420 to the top of the conductive seat 420 may keep the conductive terminal 510 being plugged in the plugging slot 401 with respect to a rotation of the panel assembly 300, so that a power supply to the panel assembly 300 is maintained. When the sunroof device is opened upward, the electronic components thereon may keep working.

While this disclosure has been described by means of specific embodiments, numerous modifications and variations could be made thereto by those skilled in the art without departing from the scope and spirit of this disclosure set forth in the claims.

What is claimed is:

1. A sunroof device, comprising:
   a window frame assembly, comprising a pair of rails disposed parallelly to each other and arranged on two sides thereof opposite to each other;
   a pair of linkage assemblies, slidably arranged on the rails respectively, each linkage assembly comprising a rotational shaft, and multiple rotational shafts collectively disposed on a rotation axis;
   a panel assembly, disposed on and rotatable with respect to the pair of linkage assemblies with an open-close path, and a rear edge thereof rotating around the rotation axis and moving away from the window frame assembly in the open-close path;
   a first electrical connector, arranged on the window frame assembly, comprising an opening and a plugging slot corresponding to the opening, and the opening defined on one side of the first electrical connector and extended to a top of the first electrical connector; and
   a second electrical connector, arranged on a front-end portion of the panel assembly, and comprising a conductive terminal,
   wherein when the panel assembly is configured to rotate around the rotation axis in the open-close path, the opening allows the conductive terminal to move with the panel assembly in the plugging slot.

2. The sunroof device according to claim 1, wherein the panel assembly is movable in a moving path with respect to the pair of linkage assemblies, the conductive terminal is plugged in the plugging slot through the opening when the panel assembly moves in the moving path.

3. The sunroof device according to claim 1, wherein the first electrical connector comprises an insulation seat and a conductive seat arranged on the insulation seat, the conductive seat comprises a pair of conductive plates disposed spacedly, the plugging slot is defined between the pair of conductive plates, and the opening is defined on the insulation seat.

4. The sunroof device according to claim 3, wherein the conductive terminal is clamped between the pair of conductive plates when the conductive terminal is plugged to the plugging slot through the opening.

5. The sunroof device according to claim 3, wherein the conductive seat is a metal sheet form by stamping manner, and the pair of conductive plates and the conductive seat are in a one-piece form.

6. The sunroof device according to claim 1, wherein each of the conductive plates comprises a guiding slope, a pair of guiding slopes are extended toward the opening and expanded outward.

7. The sunroof device according to claim 1, wherein each linkage assembly comprises a linkage member, the rotational shafts are arranged correspondingly in the rails to be longitudinally slidable with respect to the rails, the linkage member is attached to the panel assembly and connected to the rotational shaft.

8. The sunroof device according to claim 1, wherein the first electrical connector comprises an insulation seat and a conductive seat arranged on the insulation seat, the window frame assembly comprises a front frame, and the insulation seat and the front frame are in a one-piece form.

9. The sunroof device according to claim 1, wherein each of the rails comprises a front rail end corresponding to the open-close path, when the panel assembly is configured to rotate in the open-close path, the linkage assemblies are located at multiple front rail ends respectively.

10. The sunroof device according to claim 9, wherein the first electrical connector is disposed adjacent to the front rail end.

11. The sunroof device according to claim 1, wherein the panel assembly comprises a front edge disposed to straddle the pair of linkage assemblies, and the rotation axis is disposed adjacent to the front edge.

12. A sunroof device, comprising:
    a window frame assembly, comprising a pair of rails disposed parallelly to each other and arranged on two sides thereof opposite to each other;
    a pair of linkage assemblies, slidably arranged on the rails, each of the linkage assemblies comprising a rotational shaft, and a pair of rotational shafts collectively arranged on a rotation axis;
    a panel assembly, movably disposed on the pair of linkage assemblies with an open-close path and a moving path, a rear end portion thereof rotating around the rotation axis and moving away from the window frame assembly in the open-close path;
    a first electrical connector, arranged on the window frame assembly, comprising an opening and a plugging slot corresponding to the opening, the opening defined on a side of the first electrical connector and extended to a top of the first electrical connector; and
    a second electrical connector, arranged on a front-end portion of the panel assembly, and comprising a conductive terminal,
    wherein the conductive terminal is plugged to the plugging slot through the opening when the panel assembly is configured to move in the moving path.

13. The sunroof device according to claim 12, wherein the first electrical connector comprises an insulation seat and a conductive seat arranged on the insulation seat, the conductive seat comprises a pair of conductive plates disposed spacedly, the plugging slot is defined between the pair of conductive plates, and the opening is defined on the insulation seat.

14. The sunroof device according to claim 13, wherein the conductive terminal is clamped between the pair of conductive plates when the conductive terminal is plugged to the plugging slot through the opening.

15. The sunroof device according to claim 13, wherein the conductive seat is a metal sheet in a stamping manner, and the pair of conductive plates and the conductive seat are in a one-piece form.

16. The sunroof device according to claim 12, wherein each of the conductive plates comprises a guiding slope, a pair of guiding slopes are extended toward the opening and expanded outward.

17. The sunroof device according to claim 12, wherein each linkage assembly comprises a linkage member, the rotational shafts are arranged correspondingly in the rails to be longitudinally slidable with respect to the rails, the linkage member is attached to the panel assembly, and the linkage member is connected to the rotational shaft.

18. The sunroof device according to claim 12, wherein the first electrical connector comprises an insulation seat and a conductive seat arranged on the insulation seat, the window frame assembly comprises a front frame, and the insulation seat and the front frame are in a one-piece form.

19. The sunroof device according to claim 12, wherein each of the rails comprises a front rail end corresponding to the open-close path, when the panel assembly is configured to rotate in the open-close path, the linkage assemblies are located at multiple front rail ends respectively.

20. The sunroof device according to claim 19, wherein the first electrical connector is disposed adjacent to the front rail end.

21. The sunroof device according to claim 12, wherein the panel assembly comprises a front edge disposed to straddle the pair of linkage assemblies, and the rotation axis is disposed adjacent to the front edge.

* * * * *